(12) United States Patent
Kato et al.

(10) Patent No.: US 7,188,830 B2
(45) Date of Patent: Mar. 13, 2007

(54) FLUID-FILLED ACTIVE DAMPING APPARATUS

(75) Inventors: Kazuhiko Kato, Komaki (JP); Kei Okumura, Kakamigahara (JP)

(73) Assignee: Tokai Rubber Industries, Ltd., Komaki (JP)

( * ) Notice: Subject to any disclaimer, the term of this patent is extended or adjusted under 35 U.S.C. 154(b) by 123 days.

(21) Appl. No.: 11/166,546

(22) Filed: Jun. 27, 2005

(65) Prior Publication Data

US 2006/0001204 A1  Jan. 5, 2006

(30) Foreign Application Priority Data

Jun. 30, 2004  (JP) .............................. 2004-192441

(51) Int. Cl.
*F16F 13/00*  (2006.01)

(52) U.S. Cl. ............................. 267/140.14; 267/140.15

(58) Field of Classification Search .......... 267/140.13, 267/140.14, 140.15
See application file for complete search history.

(56) References Cited

U.S. PATENT DOCUMENTS

| | | | | |
|---|---|---|---|---|
| 4,635,910 A | * | 1/1987 | Ozawa et al. ........... | 267/140.14 |
| 4,647,023 A | | 3/1987 | Ray et al. | |
| 4,730,584 A | * | 3/1988 | Jordens et al. ......... | 267/140.14 |
| 4,793,600 A | * | 12/1988 | Kojima ................. | 267/140.14 |
| 4,805,884 A | * | 2/1989 | Jordens et al. ......... | 267/140.14 |
| 4,872,652 A | * | 10/1989 | Rohner et al. ......... | 267/140.14 |
| 5,242,158 A | * | 9/1993 | Robic et al. ........... | 267/140.14 |
| 5,356,123 A | * | 10/1994 | Hamada et al. ........ | 267/140.14 |
| 5,366,211 A | * | 11/1994 | Hamada et al. ........ | 267/140.14 |
| 5,462,262 A | * | 10/1995 | Gennesseaux ......... | 267/140.13 |
| 5,571,264 A | * | 11/1996 | Maruyama et al. .... | 267/140.14 |
| 5,647,579 A | * | 7/1997 | Satoh .................... | 267/140.14 |
| 5,769,402 A | * | 6/1998 | Ide et al. ............... | 267/140.14 |
| 5,865,428 A | * | 2/1999 | Kojima .................. | 267/140.14 |
| 5,911,412 A | * | 6/1999 | Durand et al. ......... | 267/140.13 |
| 6,010,120 A | * | 1/2000 | Nagasawa .............. | 267/140.14 |
| 6,073,918 A | * | 6/2000 | Kojima et al. ......... | 267/140.14 |
| 6,176,477 B1 | * | 1/2001 | Takeo et al. ........... | 267/140.11 |
| 6,186,485 B1 | * | 2/2001 | Kawazoe ............... | 267/140.14 |
| 6,189,873 B1 | * | 2/2001 | Aoki ..................... | 267/140.14 |
| 6,315,277 B1 | * | 11/2001 | Nagasawa .............. | 267/140.14 |

(Continued)

FOREIGN PATENT DOCUMENTS

JP  A-60-252834  12/1985

(Continued)

*Primary Examiner*—Robert A. Siconolfi
(74) *Attorney, Agent, or Firm*—Oliff & Berridge PLC (57) ABSTRACT

A fluid-filled active damping apparatus having a pressure receiving chamber divided by a partition member into a primary fluid chamber and an auxiliary fluid chamber. The partition member houses a movable plate extending entirely across between opposing faces of upper and lower through holes of the partition member. Elastic projections of the movable plate from its outer peripheral portion are held sandwiched between upper and lower divider plates of the partition member, so that the movable plate is exposed to the primary fluid chamber through the upper through hole and to the auxiliary fluid chamber through the lower through hole. A connecting gap is formed between the upper and lower divider plates and the peripheral portion of the movable plate where the elastic projections have not been formed, to connect the primary and the auxiliary fluid chambers through the through holes and the connecting gap.

8 Claims, 3 Drawing Sheets

U.S. PATENT DOCUMENTS

| | | | |
|---|---|---|---|
| 6,394,433 B1 * | 5/2002 | Ersoy et al. | 267/140.14 |
| 6,422,545 B1 * | 7/2002 | Baudendistel et al. | 267/140.13 |
| 6,422,546 B1 | 7/2002 | Nemoto et al. | |
| 6,601,835 B2 * | 8/2003 | Genesseaux | 267/140.13 |
| 6,622,995 B2 * | 9/2003 | Baudendistel et al. | 267/140.14 |
| 6,722,641 B2 * | 4/2004 | Yamada et al. | 267/140.14 |
| 6,994,332 B2 * | 2/2006 | Goto et al. | 267/140.13 |
| 7,025,341 B2 * | 4/2006 | Ichikawa et al. | 267/140.14 |
| 2004/0086134 A1 | 5/2004 | Matsuoka et al. | |
| 2004/0188904 A1 * | 9/2004 | Ichikawa et al. | 267/140.14 |
| 2005/0258581 A1 * | 11/2005 | Tanaka | 267/140.11 |

FOREIGN PATENT DOCUMENTS

| | | |
|---|---|---|
| JP | U-05-032848 | 4/1993 |
| JP | Y2-2523231 | 10/1996 |
| JP | A-2000-213586 | 8/2000 |
| JP | A-2001-001765 | 1/2001 |
| JP | A-2002-155984 | 5/2002 |
| JP | A-2002-188677 | 7/2002 |
| JP | A-2002-295571 | 10/2002 |
| JP | A-2003-074617 | 3/2003 |
| JP | A-2003-339145 | 11/2003 |
| JP | A-2004-052872 | 2/2004 |

* cited by examiner

FLUID-FILLED ACTIVE DAMPING APPARATUS

The disclosure of Japanese Patent Application No. 2004-192441 filed on Jun. 30, 2004 including the specification, drawings and abstract is incorporated herein by reference in its entirety.

BACKGROUND OF THE INVENTION

1. Field of the Invention

The present invention generally relates to an active damping apparatus capable of exhibiting dynamic vibration damping action by means of actively controlling pressure fluctuations in a pressure receiving chamber having non-compressible fluid sealed therein, and in particular relates to a fluid-filled active damping apparatus wherein a portion of the wall of the pressure receiving chamber is formed by a displaceable oscillation plate, and pressure in the pressure receiving chamber is controlled on the basis of excited displacement of the oscillation plate by means of an actuator.

2. Description of the Related Art

Fluid-filled active damping apparatus are known as one type of vibration damping connector or vibration damping support interposed between components targeted for damping, such as an automotive engine mount or body mount, to provide vibration damping linkage of components. A damping apparatus of this kind includes: a first mounting member attachable to one of the two components being linked in the vibration damping fashion; a second mounting member attachable to the other of the two components; a rubber elastic body elastically connecting the first and second mounting members; a pressure receiving chamber whose wall portion is partially constituted by the rubber elastic body, and subjected to input of vibration; an equilibrium chamber whose wall portion is partially constituted by a flexible diaphragm, and having a variable volume. These pressure receiving chamber and equilibrium chamber have a non-compressible fluid sealed therein, and held in fluid communication to each other through an orifice passage. In the damping apparatus of this design, when vibration is applied to the pressure receiving chamber, on the basis of the pressure difference created between the pressure receiving chamber and the equilibrium chamber, fluid is forced to flow through the orifice passage, whereby passive vibration damping effect is exhibited on the basis of resonance action or other flow action of the fluid.

A vibration damping apparatus of this kind that utilizes only passive vibration damping action, have a difficulty in providing sufficient vibration damping action in the event that the frequency or other characteristics of vibration targeted for damping should change, or that higher vibration damping action is required.

In recent years, there has been developed and tested dynamic vibration damping apparatus of fluid-filled that utilize an electromagnetic or pneumatic actuator to dynamically control the pressure of the pressure receiving chamber in a cycle corresponding to the frequency of the vibration targeted for damping, in order to actively reduce vibration. In such a dynamic vibration damping apparatus, as taught in JP-A-2002-188677, for example, another portion of the wall of this pressure receiving chamber is constituted by an oscillation plate. The oscillation plate is elastically supported and capable of displacement on the second mounting member etc. via a rubber elastic body, with pressure of the pressure receiving chamber being controlled on the basis of excited deformation of the plate by the actuator. With this arrangement, for example, in response to relatively low-frequency vibration such as engine shake etc., it is possible to obtain passive vibration damping effect on the basis of resonance action or other flow action of fluid through the orifice passage (orifice effect). In addition, in response to relatively high-frequency vibration such as idling vibration or driving rumble or booming noises, it is possible to obtain dynamic vibration damping effect on the basis of pressure control of the pressure receiving chamber by means of displacement of the oscillation plate.

However, in a fluid-filled dynamic vibration damping apparatus, since deformation of the oscillation plate is permitted on the basis of elastic deformation of a supporting rubber elastic body, during input of vibration in the low frequency range which requires the orifice effect, the pressure fluctuations of the pressure receiving chamber are absorbed by means of elastic deformation of the supporting rubber elastic body and associated displacement of the oscillation plate. As a result, it is difficult to produce a sufficient pressure difference between the pressure receiving chamber and the equilibrium chamber, the flow of fluid through the orifice passage drops, and there is a risk that passive vibration damping action on the basis of resonance action etc. of the fluid will not be advantageously obtained.

To address this problem, it has been contemplated to cause static drive force to act on the oscillation plate and the supporting rubber elastic body in order to maintain a constrained state, as taught in JP-A-2002-295571, for example. However, in a dynamic vibration damping apparatus, if constriction force at a level adequate to constrain displacement is exerted on the oscillation plate and the fluid-filled dynamic vibration damping apparatus, appreciable stress and deformation are produced in the supporting rubber elastic body, and problems of permanent set in fatigue and/or durability thereof tend to occur. An additional problem is that where both passive vibration damping effect by the orifice passage and dynamic vibration damping effect by displacement of the oscillation plate are required at the same time, it may not be possible to handle the situation appropriately.

In fluid-filled dynamic vibration damping apparatus of the conventional designs described hereinabove, in order to achieve dynamic vibration damping effect, it is necessary to subject the pressure receiving chamber to the action of pressure fluctuations that, with as high a degree of precision as possible, correspond to the frequency and waveform of the vibration targeted for damping.

However, the fact is that in actual practice it is difficult to make pressure fluctuations exerted on the pressure receiving chamber by means of exciting actuation of the oscillation plate correspond with high precision to vibration targeted for damping. There are several reasons for this. For example, typically the actuating force of the actuator acts on the oscillation plate in only one direction, with return motion in the opposite direction produced by the elastic behavior of the supporting rubber elastic body, so that one cause is a difference in actuating force between outbound and return. Another cause is high order components of elastic deformation of the supporting rubber elastic body per se which elastically supports the oscillation plate. In constructions in which the oscillation plate undergoes excited displacement by a pneumatic actuator, yet another cause is that during excited actuation by means of switching air pressure, pressure pulsations are produced on the air pressure transmission path. In constructions that employ an electromagnetic actuator that uses electromagnetic or magnetic force, another cause is that since the relative positions of the movable element and the stationary element change in association with displacement of the movable element, the generated force changes as well. Additionally, where generated actuating force is controlled by means of an electrical signal, another cause is high frequency components produced in the actuating force, due to noise of various kinds in the electrical signal.

To cope with these problems, there has been proposed, for example in JP-A-2004-52872, a construction in which a partition member is provided to the pressure receiving chamber, dividing the pressure receiving chamber into a primary fluid chamber whose wall is partially constituted by a rubber elastic body, and an auxiliary fluid chamber whose wall is partially constituted by the oscillation plate, with a filter orifice provided between the primary fluid chamber and the auxiliary fluid chamber. This is, by tuning the filter orifice to a lower frequency range than the high order components causing the problem, pressure fluctuations produced in the auxiliary fluid chamber are exerted on the primary fluid chamber, in a condition in which high order components have been eliminated.

However, with the dynamic vibration damping apparatus taught in JP-A-2004-52872, in the event that large-amplitude vibration is input to the pressure receiving chamber, pressure fluctuations of the primary fluid chamber are transmitted to the auxiliary fluid chamber through the filter orifice regardless of whether the filter orifice has been tuned. As a result, the pressure of the pressure receiving chamber (the primary fluid chamber and the auxiliary fluid chamber) escapes due to deformation of the oscillation plate constituting the wall of the auxiliary fluid chamber and of the supporting rubber elastic body, making it difficult to ensure an adequate pressure difference between the pressure receiving chamber and the equilibrium chamber. Thus, the aforementioned problem of not being able to achieve the desired passive vibration damping action due to the difficulty of ensuring adequate fluid flow through the orifice passage remains unresolved.

SUMMARY OF THE INVENTION

It is therefore one object of this invention to provide a fluid-filled active damping apparatus of novel construction, which is able to effectively avoid both (i) diminished passive vibration damping action based on fluid flow action through the orifice passage, caused by pressure fluctuation of the pressure receiving chamber being absorbed by the oscillation plate and elastic support member, and (ii) diminished dynamic vibration damping action by means of excited displacement of the oscillation plate, due to pressure fluctuations of typically high-frequency components not corresponding to vibration targeted for damping; and which effectively exhibits both passive vibration damping action against low-frequency vibration and dynamic vibration damping action against medium-to-high-frequency vibration.

The above and/or optional objects of this invention may be attained according to at least one of the following modes of the invention. The following modes and/or elements employed in each mode of the invention may be adopted at any possible optional combinations. It is to be understood that the principle of the invention is not limited to these modes of the invention and combinations of the technical features, but may otherwise be recognized based on the teachings of the present invention disclosed in the entire specification and drawings or that may be recognized by those skilled in the art in the light of the present disclosure in its entirety.

A first mode of the present invention provides a fluid-filled active damping apparatus comprising: a first mounting member; a second mounting member; a rubber elastic body elastically connecting the first and second mounting members; a pressure receiving chamber filled with a non-compressible fluid, whose wall is partially defined by the rubber elastic body, and subjected to input of vibration; an equilibrium chamber filled with the non-compressible fluid, whose wall is partially defined by a flexible diaphragm to readily permit change in volume; an oscillation plate defining an another portion of the wall of the pressure receiving chamber, and elastically supported so to be capable of displacement, the oscillation plate being excited by an actuator for pressure control of the pressure receiving chamber; a partition member fixedly supported on the second mounting member to divide the pressure receiving chamber, forming to either side of the partition member a primary fluid chamber situated on the rubber elastic body side and an auxiliary fluid chamber situated on the oscillation plate side, the primary fluid chamber and the auxiliary fluid chamber being held in communication with each other through a communication hole formed in the partition member; and an orifice passage being provided connecting the primary fluid chamber and the equilibrium chamber to each other. The partition member includes: an upper divider plate and a lower divider plate superposed on each other, with the communication hole being formed in combination with at least one upper through hole provided in the upper divider plate and at least one lower through hole provided in the lower divider plate; and a movable plate of size extending entirely across between opposing faces of the upper and lower through holes, being disposed between the upper divider plate and the lower divider plate. A plurality of elastic projections that project to both sides of the movable plate from an outer peripheral portion of a first and a second face of the movable plate, so as to be spaced apart from one another on a circumferential direction of the movable plate, these elastic projections being held sandwiched between the upper divider plate and the lower divider plate so that the first face of the movable plate is exposed to the primary fluid chamber through the upper through hole and the second face of the movable plate is exposed to the auxiliary fluid chamber through the lower through hole, whereby when a pressure difference between the primary fluid chamber and the auxiliary fluid chamber is exerted across the movable plate, the movable plate undergoes displacement between the upper divider plate and the lower divider plate. The upper through hole or the lower through hole is blocked off by the movable plate by means of the movable plate coming into contact with the upper divider plate or the lower divider plate, and a resonance frequency of fluid induced to flow through the upper and lower through holes in association with displacement of the movable plate is established at a frequency equal to or above that of vibration targeted for damping by pressure control of the pressure receiving chamber by means of excitation actuation of the oscillation plate. A connecting gap is formed between the upper and lower divider plates and the peripheral portion of the movable plate where the elastic projections have not been formed, to connect the primary fluid chamber and the auxiliary fluid chamber to each other through the upper and lower through holes and the connecting gap.

In the fluid type active damping apparatus constructed according to this mode, when large-amplitude vibration is exerted on the primary fluid chamber, the movable plate undergoes appreciable displacement, blocking off the upper through hole or lower through hole formed in the upper and lower divider plates. This has the effect of preventing pressure from escaping from the primary fluid chamber to the auxiliary fluid chamber, preventing absorption of pressure of the primary fluid chamber caused by displacement and deformation of the oscillation plate making up part of the auxiliary fluid chamber wall, and of the supporting rubber elastic body. Thus, pressure fluctuations are efficiently produced in the primary fluid chamber in association with elastic deformation of the rubber elastic body, large relative pressure fluctuations are created between the primary fluid chamber and the equilibrium chamber, and sufficient flow of fluid through the orifice passage between the two chambers is assured, whereby passive vibration damping action based of flow action of fluid through the orifice passage is advantageously achieved.

In this mode of the invention additionally, since dynamic vibration damping effect is established at or above the frequency of the vibration targeted for damping, dynamic vibration damping effect is advantageously achieved. Specifically, when exhibiting dynamic vibration damping effect, pressure fluctuations produced in the auxiliary fluid chamber by excitation actuation of the oscillation plate at the frequency range of the vibration targeted for damping are transmitted efficiently to the primary fluid chamber, by means of fluid flow through the upper through hole and the lower through hole, produced in association with displacement of the movable plate.

During transmission of pressure from the auxiliary fluid chamber to the primary fluid chamber in this way, there is also exhibited a filter effect, utilizing the antiresonance action of the fluid caused to flow through the upper through hole and lower through hole. Specifically, even in the event that high order components or high frequency component pressure fluctuations have occurred in the auxiliary fluid chamber, pressure fluctuations of a frequency component that does not correspond to the frequency of the vibration targeted for damping can be suppressed by the filter effect and does not transmitted from the auxiliary fluid chamber to the primary fluid chamber. Thus, in the pressure receiving chamber composed of the primary fluid chamber and the auxiliary fluid chamber, it is possible to carry out pressure control with high accuracy depending on the frequency and waveform of the vibration targeted for damping, so that dynamic vibration damping action is advantageously achieved.

In this mode, by sandwiching elastic projections which projected out to both sides from the outer peripheral portion of the movable plate, stable disposition of the movable plate is maintained even during displacement thereof. Accordingly, even if the movable plate undergoes displacement by being subjected to considerable pressure, significant tilting thereof relative to the upper and lower divider plates resulting in localized striking against them, or irregular striking against them due to flutter, can be prevented. Additionally, sudden, sharp displacement of the movable plate is cushioned on the basis of elastic deformation of the elastic projections. Thus, even if large-amplitude vibration should be input to the pressure receiving chamber causing the movable plate to strike against the upper and lower divider plates, the occurrence of significant noise and shock is suppressed.

The actuator for the oscillation plate is not limited to any particular type, examples being a pneumatic actuator that utilizes negative pressure and atmospheric pressure as taught in JP-A-2002-295571, or electromagnetic actuators using electromagnetic or magnetic force as taught in JP-A-2002-188677 or JP-A-2004-52872. However, these known actuators typically produce actuating force that acts in one direction only, with return operation in the opposite direction produced by the elastic behavior of the supporting rubber elastic body which elastically supports the oscillation plate. That is, when the oscillation plate is subjected to exciting actuation, the equilibrium position (the center position of amplitude) of the oscillation plate becomes displaced biaswise by a predetermined extent in the actuation direction. Thus, since the initial position of the oscillation plate changes during exciting actuation, there is produced a pressure differential between the primary fluid chamber and the auxiliary fluid chamber caused thereby, posing the risk that exciting actuation characteristics of the oscillation plate will be impaired, and of problems with permanent set in fatigue and/or durability of the supporting rubber elastic body.

According to this mode of the invention, since the elastic projections are formed partially on the perimeter of the outer peripheral portion of the movable plate, a connecting gap connecting together the primary fluid chamber and the auxiliary fluid chamber through the through holes in the upper and lower divider plates is assured. With this arrangement, a pressure difference between the primary fluid chamber and the auxiliary fluid chamber in association with a change in the initial position of the oscillation plate is rapidly dissipated through the connecting gap. Thus, problems such as those described above resulting from a static pressure difference between the primary fluid chamber and the auxiliary fluid chamber are avoided, and the desired vibration damping action is achieved more consistently.

A second mode of the invention provides a fluid-filled active damping apparatus according to the first mode of the invention, wherein the movable plate is of a generally laminated construction having a constriction plate member more rigid than the rubber elastic plate affixed to the constriction plate member, and notched portions are provided at a plurality of locations on a perimeter of an outer peripheral portion of the constriction plate member, the elastic projections being integrally formed so as to project out from respective portions of the rubber elastic plate situated at the notched portions.

In this mode of the invention, the constriction plate member is employed, the movable plate can be endowed with high rigidity while still making it sufficiently thin and compact. At the projecting portions of the elastic projections, a high degree of freedom in elastic deformation of the elastic projections is assured by means of the notched portions in the constriction plate member, permitting sufficient displacement of the movable plate. Accordingly, the movable plate strikes against the upper and lower divider plates in a more stable manner so that the through holes are blocked off more reliably. Also, deformation of the movable plate while striking the divider plates is suppressed. As a result, pressure leakage from the primary fluid chamber occurring when large-amplitude vibration is input to the primary fluid chamber is more effectively suppressed. Additionally, since a part of the laminated construction of the movable plate is formed by the rubber elastic plate, when the movable plate strikes against the upper or lower divider plate, resultant noise and shock is suppressed by the cushioning action of the rubber elastic plate.

A third mode of the invention provides a fluid-filled active damping apparatus according to the aforesaid first or second mode, wherein the at least one upper through hole is formed by one opening in the center portion of the upper divider plate, while the at least one lower through hole comprises a plurality of lower through holes formed in the lower divider plate, each having a smaller opening area than the upper through hole.

In this mode, by giving the upper through hole a large opening area, pressure control of the primary fluid chamber in associated with displacement of the movable plate can be carried out more efficiently. Additionally, by giving the lower through holes a small opening area, tuning of resonance action and other flow characteristics of fluid induced to flow through the upper and lower through holes can be advantageously assured, while maintaining a large opening area on the part of the upper through hole.

A fourth mode of the invention provides a fluid-filled active damping apparatus according to any one of the first through third modes, wherein the actuator comprises an electromagnetic actuator that generates actuating force by means of electrical current to a coil.

In this mode of the invention, pressure fluctuations of high frequency components, which tend to become a problem with electromagnetic actuator, are dissipated by means of the filter effect, ensuring a high precise pressure control even in the high frequency range, and thereby ensuring further improvements in active vibration damping action.

A fifth mode of the invention provides a fluid-filled active damping apparatus according to any one of the first through fourth modes, wherein the first mounting member is disposed spaced apart from one open end of the second mounting member of generally tubular shape; the one open end of the second mounting member is provided fluid-tight closure by the rubber elastic body that elastically connects the first mounting member and the second mounting member; the oscillation plate is disposed at an other open end of the second mounting member, with an outer peripheral edge of the oscillation plate elastically connected by an annular supporting rubber elastic body to the other open end of the second mounting member, whereby the other open end of the second mounting member is provided fluid-tight closure; the pressure receiving chamber is formed between opposing faces of the rubber elastic body and the oscillation plate; the actuator is disposed on an opposite side from the pressure receiving chamber with the oscillation plate therebetween; and the partition member is disposed in an medial portion of the opposing faces of the rubber elastic body and the oscillation plate so as to extend in an axis-perpendicular direction of the second mounting member, with an outer peripheral edge of the partition member fixedly supported by means of the second mounting member.

In this mode of the invention, the first mounting member and the second mounting member, the rubber elastic body, the oscillation plate, the partition member, and the actuator are skillfully assembled and disposed so as to advantageously constitute the desired dynamic vibration damping apparatus of fluid-filled type with a pressure receiving chamber composed of a primary fluid chamber and an auxiliary fluid chamber.

A sixth mode of the invention provides a fluid-filled active damping apparatus according to the aforesaid fifth mode, wherein the flexible diaphragm is formed by a rubber diaphragm extending in generally annular shape so as to cover an outer peripheral side of the rubber elastic body, with an outer peripheral edge portion of the rubber diaphragm affixed to the one open end of the second mounting member and an inner peripheral edge portion of the rubber diaphragm affixed to the first mounting member, thereby forming the equilibrium chamber to an opposite side from the pressure receiving chamber with the rubber elastic body therebetween.

In this mode of the invention, the pressure receiving chamber and the equilibrium chamber are formed to either side of the rubber elastic body, whereby it is possible to hold the distance separating the first mounting member and the second mounting member in the center axial direction to a minimum, so that the vibration damping apparatus overall can be made more compact in size in the center axial direction. An additional advantage is that it becomes possible to establish the elastic center of the vibration damping apparatus at a lower location from the support face, which is favorable for the purpose of implementation in an automotive engine mount, for example.

A seventh mode of the invention provides a fluid-filled active damping apparatus according to any one of the aforesaid first through sixth modes, wherein the first mounting member is fastened to either a power unit or a body of an automobile, with the second mounting member being fastened to an other in order to constitute an automotive engine mount; the orifice passage is tuned to low frequency corresponding to engine shake; when low-frequency, large-amplitude vibration of +1.0 mm or greater corresponding to engine shake is input, the movable plate strikes against the upper divider plate and the lower divider plate thereby substantially blocking off the communication hole; and when medium-to-high-frequency, small-amplitude vibration of ±0.1 mm or less corresponding to idling vibration or booming noises is input, striking of the movable plate against the upper divider plate and the lower divider plate is avoided so that the communication hole are maintained in the open state.

In this mode of the invention, it is possible to advantageously achieve vibration damping ability by high attenuating action against low-frequency, large-amplitude vibration such as engine shake which, while differing somewhat depending on the model, is a problem for most automobiles. Also, it is possible to advantageously achieve vibration-damping ability through low dynamic spring rate effect against medium-frequency vibration such as idling vibration and high-frequency vibration such as drive rumble.

In the present invention, it is also possible to tune displacement and deformation characteristics of the movable plate to a specific frequency range. For example, by tuning the characteristic frequency of the movable plate to the frequency range of specific vibration targeted for dynamic vibration damping (such as drive rumble), thereby improving the efficiency of pressure transmission from the auxiliary fluid chamber to the primary fluid chamber utilizing resonance action of the movable plate. The characteristic frequency of the movable plate is that when disposed in the pressure receiving chamber with non-compressible fluid sealed therein. When tuning the characteristic frequency of the movable plate, in order to effectively achieve dynamic vibration damping effect, it should be tuned to a frequency range equal to or above the highest frequency of the frequencies targeted for dynamic vibration damping. Elastic contact projections can also be formed in the movable plate at locations thereof that strike the upper and lower divider plates, to provide further cushioning of impact when the movable plate strikes the divider plates.

As will be apparent from the preceding description, in the fluid-filled dynamic vibration damping apparatus constructed according to the invention, elastic projections formed projecting to either side at the outer peripheral portion of the movable plate are sandwiched by upper and lower divider plates, whereby stable disposition of the movable plate is maintained even during displacement thereof. Accordingly, even when the movable plate undergoes displacement during input of large-amplitude vibration, it stably strikes against the upper and lower divider plates and covers the through holes, whereby escape of pressure from the primary fluid chamber to the auxiliary fluid chamber is prevented, and passive vibration damping effect on the basis of the orifice effect is advantageously achieved.

Additionally, in the fluid-filled dynamic vibration damping apparatus of the present invention, in the outer peripheral portion of the movable plate where no elastic projections are formed, there is assured connecting gap connecting the primary fluid chamber and the auxiliary fluid chamber to one another through the through holes in upper and lower divider plates. Thus, a pressure difference between the primary fluid chamber and the auxiliary fluid chamber in association which change in the initial position of the oscillation plate, arising for example through the use of actuator that drives in one direction only, can be rapidly dissipated through the connecting gap and the upper and lower through holes, whereby dynamic vibration damping effect on the basis of excited displacement of the oscillation plate may be achieved more effectively.

BRIEF DESCRIPTION OF THE DRAWINGS

The forgoing and/or other objects features and advantages of the invention will become more apparent from the following description of a preferred embodiment with reference to the accompanying drawings in which like reference numerals designate like elements and wherein.

DETAILED DESCRIPTION OF PREFERRED EMBODIMENT(S)

Figure 1:
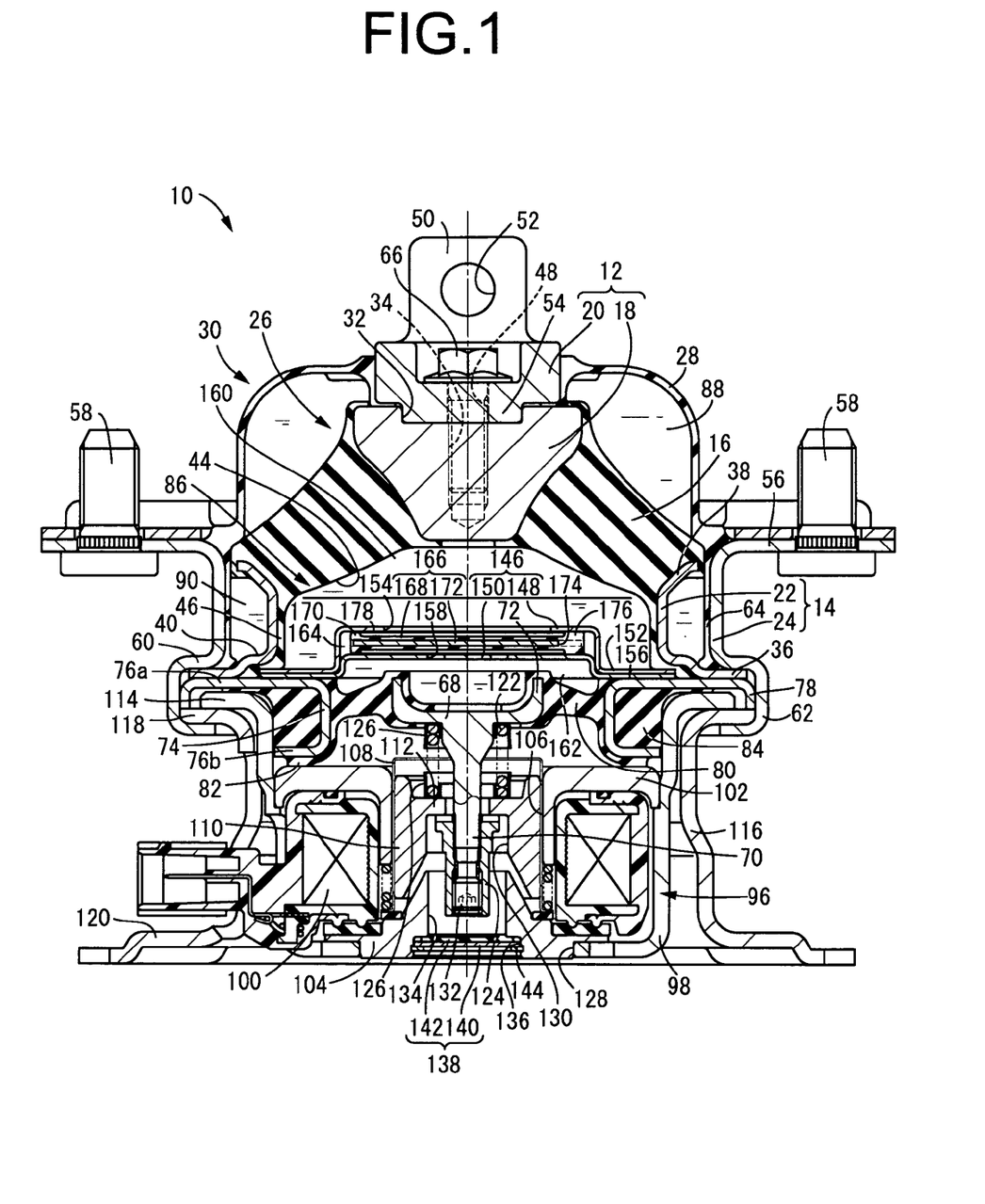
FIG. 1 is an elevational view in axial or vertical cross section of a fluid-filled active damping apparatus in the form of an engine mount for use in an automotive vehicle, taken along line 1—1 of FIG. 3.

Referring first to FIG. 1, there is illustrated an automotive engine mount 10 of construction according to one embodiment of a fluid-filled active damping apparatus of the present invention, for use in an automotive vehicle. This engine mount 10 has a construction wherein a metallic first mounting member 12 and a metallic second mounting member 14 are elastically linked by means of a rubber elastic body 16. The first mounting member 12 is adapted to be attached to the vehicle's power unit (not shown) and the second mounting member 14 is adapted to be attached to the automobile body (not shown) so that the power unit is supported on the body in a vibration-damping manner. With the engine mount 10 being so installed, distributed load of the power unit and principle vibration targeted for damping are input across the first mounting member 12 and the second mounting member 14, in the generally axial direction of the engine mount 10 (vertical direction in FIG. 1). In the description hereinbelow, unless indicated otherwise, vertical direction refers to the vertical direction in FIG. 1.

More specifically, the first mounting member 12 includes an elastic body inner fitting 18 and a diaphragm inner fitting 20. The second mounting member 14 includes an elastic body outer tubular fitting 22 and a diaphragm outer tubular fitting 24. The elastic body inner fitting 18 and the elastic body outer tubular fitting 22 are bonded to the rubber elastic body 16 by vulcanization, thereby constituting a first integrally vulcanization molded component 26 (see FIG. 2). The diaphragm inner fitting 20 and the diaphragm outer tubular fitting 24 are bonded to a rubber diaphragm 28 serving as a flexible diaphragm, constituting a second integrally vulcanization molded component 30.

Figure 2:
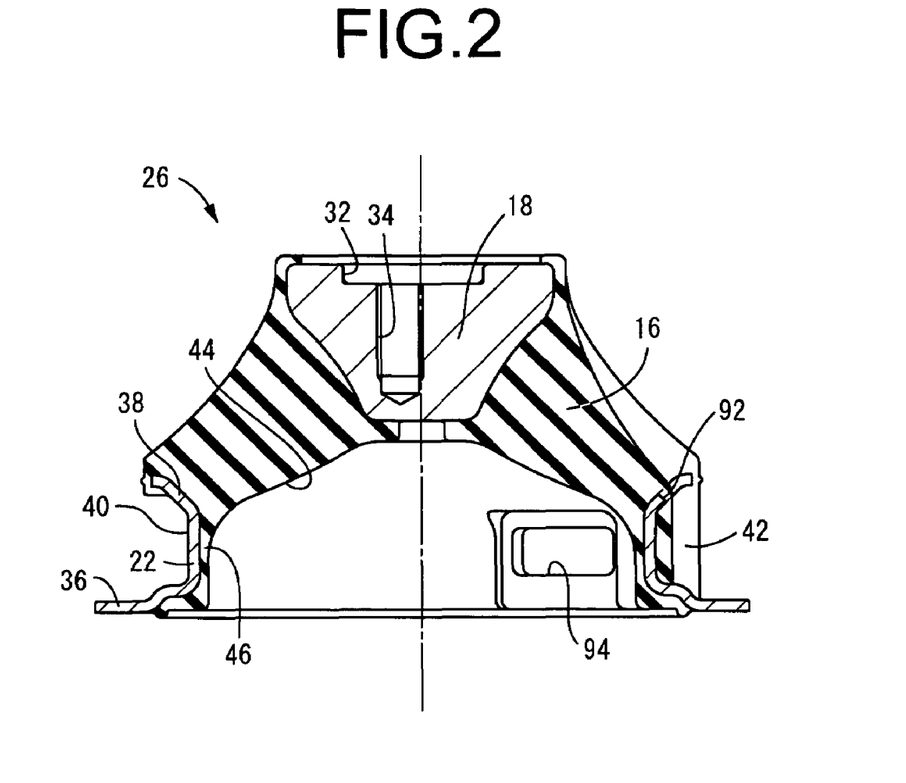
FIG. 2 is an enlarged view in vertical or axial cross section of a first integrally vulcanization molded component of the engine mount of FIG. 1.

In the first integrally vulcanization molded component 26, the elastic body inner fitting 18 constituting part of the first mounting member 12 has a generally inverted, truncated cone shape. At the upper end face (large diameter end face) of the elastic body inner fitting 18 is formed a mating recess 32 of generally polygonal shape or oval shape in plan view, in the approximately center portion of which is formed a screw hole 34 extending a predetermined depth in the axial direction (vertical direction in FIG. 1).

In the first integrally vulcanization molded component 26, the elastic body outer tubular fitting 22 which constitutes part of the second mounting member 14 has a large-diameter, generally tubular shape, with a diametrically outward flaring flange portion 36 integrally formed at the lower end, and a taper portion 38 whose diameter dimension gradually becomes smaller in conical shape going downward is integrally formed at the upper end. With this arrangement, there is formed on the outer peripheral face of the elastic body outer tubular fitting 22 a circumferential groove 40 opening diametrically outward and extending in the circumferential direction. As shown in FIG. 2, the circumferential groove 40 is packed with a divider rubber 42 integrally formed with the rubber elastic body 16 at one site on the circumference, thereby extending slightly less than once around in the circumferential direction.

By situating the elastic body inner fitting 18 on generally the same axis as the elastic body outer tubular fitting 22 but spaced apart thereabove, the outer peripheral face of the tapered shape in the elastic body inner fitting 18 and the inner peripheral face of the taper portion 38 in the elastic body outer tubular fitting 22 are positioned in opposition to each other with a gap therebetween. The rubber elastic body 16 is then disposed between the elastic body inner fitting 18 and the elastic body outer tubular fitting 22.

The rubber elastic body 16 overall has a large-diameter, generally truncated cone shape in the center portion of which the elastic body inner fitting 18 has been inserted and subjected to vulcanization bonding while positioned generally coaxially therewith, and with the taper portion 38 of the elastic body outer tubular fitting 22 superimposed on and vulcanization bonded to the outer peripheral face at the large-diameter end thereof. With this arrangement, the rubber elastic body 16 is formed as the first integrally vulcanization molded component 26 comprising the elastic body inner fitting 18 and the elastic body outer tubular fitting 22, and the opening at one end (the upper end in FIG. 1) of the second mounting member 14 which includes the elastic body outer tubular fitting 22 is covered fluid-tightly by the rubber elastic body 16. At the large-diameter end of the rubber elastic body 16 is formed a conical shaped recess 44 that opens downward. As a result of the recess 44, when load is applied across the first mounting member 12 and the second mounting member 14 causing the rubber elastic body 16 to undergo elastic deformation, tensile stress of the rubber elastic body 16 is lessened.

On the inner peripheral face of the elastic body outer tubular fitting 22 is formed a seal rubber layer 46 integrally formed with the rubber elastic body 16 and covering generally the entire surface, extending out as far as the bottom face of the flange portion 36. By means of vulcanization bonding of the outer peripheral face of the large-diameter end of the rubber elastic body 16 to the taper portion 38 of the elastic body outer tubular fitting 22, the rubber elastic body 16 exhibits consistent, approximately linear spring characteristics with respect to compressive loading in the axial direction (the vertical in FIG. 1).

In the second integrally vulcanization molded component 30, the diaphragm inner fitting 20 constituting part of the first mounting member 12 has a generally disk shape of small diameter. Additionally, the approximate center of the diaphragm inner fitting 20 is perforated in the axial direction by an insertion hole 48. At a location on the diaphragm inner fitting 20 away from the insertion hole 48 is integrally formed an upwardly projecting mounting plate 50, and the center portion of the mounting plate 50 is perforated by a mounting hole 52. On the lower face of the diaphragm inner fitting 20 is integrally formed an axially outward projecting mating protrusion 54 of shape corresponding to the mating recess 32 mentioned earlier.

In the second integrally vulcanization molded component 30, the diaphragm outer tubular fitting 24 which constitutes part of the second mounting member 14 is disposed on generally the same axis as the diaphragm inner fitting 20 and spaced apart therebelow. This diaphragm outer tubular fitting 24 has a thin-walled, generally large-diameter tubular shape, with an annular support portion 56 that flares diametrically outward in flange shape integrally formed with the upper opening thereof. At locations to each side situated in opposition in one direction across the diameter of the annular support portion 56, fastening bolts 58 project upward. An annular stepped portion 60 extending diametrically outward is integrally formed on the lower opening of the diaphragm outer tubular fitting 24, with a caulking portion 62 of generally annular configuration projecting downward formed on the outer peripheral edge of the stepped portion 60.

The inner peripheral edge of the rubber diaphragm 28 is bonded by vulcanization to the outer peripheral edge of the diaphragm inner fitting 20, and the outer peripheral edge of the rubber diaphragm 28 is bonded by vulcanization to upper rim of the diaphragm outer tubular fitting 24 and to the inner peripheral edge of the annular support portion 56. With this arrangement, the rubber diaphragm 28 is formed as the second integrally vulcanization molded component 30 comprising the diaphragm inner fitting 20 and the diaphragm outer tubular fitting 24. On the inner peripheral face of the diaphragm outer tubular fitting 24 is formed a seal rubber layer 64 integrally formed with the rubber diaphragm 28 and covering generally the entire surface, extending out as far as the lower face of the stepped portion 60 of the diaphragm outer tubular fitting 24.

The second integrally vulcanization molded component 30 is disposed covering the first integrally vulcanization molded component 26 from above, with the lower face of the diaphragm inner fitting 20 superposed onto the upper face of the elastic body inner fitting 18 and with the mating protrusion 54 inserted into the mating recess 32, thereby aligning the insertion hole 48 of the diaphragm inner fitting 20 with the screw hole 34 of the elastic body inner fitting 18.

A fastening bolt 66 is then passed through the insertion hole 48 and screwed into the screw hole 34. The elastic body outer tubular fitting 22 is press-fit into the diaphragm outer tubular fitting 24 to affix it fluid-tightly, and the flange portion 36 of the elastic body outer tubular fitting 22 is superposed onto the stepped portion 60 of the diaphragm outer tubular fitting 24. By so doing, the first mounting member 12 and the second mounting member 14 are respectively constituted, and disposed surrounding the center axis of the mounting in generally concentric arrangement.

While not explicitly depicted in the drawings, a gate-shaped stopper fitting is disposed straddling the outside of the rubber elastic body 16 and the rubber diaphragm 28, with both basal ends thereof fastened respectively to the fastening bolts 58, 58 implanted in the annular support portion 56 of the diaphragm outer tubular fitting 24. This stopper fitting is disposed spaced outwardly apart from a bracket (not shown) fastened to the first mounting member 12 and abuts the bracket, by means of which the extent of relative displacement of the first mounting member 12 and the second mounting member 14 in the rebound direction is limited.

An oscillation plate 68 is attached to the lower opening of the second mounting member 14. The oscillation plate 68 has a small-diameter, generally disk shape formed using rigid material such as metal or synthetic resin material. In the center portion of the oscillation plate 68 is integrally formed an actuating shaft 70 that extends downward, with a male thread formed on the distal end portion of the actuating shaft 70. To the outer peripheral edge of the oscillation plate 68 is integrally formed an annular connecting portion 72 of generally annular shape projecting upward.

A supporting tubular fitting 74 serving as a fastener fitting is disposed diametrically outward from the annular connecting portion 72, on generally the same center axis therewith. The supporting tubular fitting 74 has a large-diameter, generally tubular shape at the upper and lower ends of which are integrally formed flange portions 76a, 76b of annular shape each spreading outward diametrically. The outside diameter dimension of the upper flange portion 76a is greater than the outside diameter dimension of the lower flange portion 76b. On the outer peripheral edge of the upper flange portion 76a is integrally formed a downwardly extending rib 78. With this arrangement, the supporting tubular fitting 74 extends continuously all the way around in the circumferential direction, with an unchanging cross section of side opened square shape.

Between the diametrically opposed faces of the annular connecting portion 72 and the supporting tubular fitting 74 is disposed a supporting rubber elastic body 80. The supporting rubber elastic body 80 is of generally annular shape, the inner peripheral face of which is vulcanization bonded to the outer peripheral face of the annular connecting portion 72, and the outer peripheral face of which is vulcanization bonded to the inner peripheral face of the supporting tubular fitting 74. That is, the supporting rubber elastic body 80 is formed as an integrally vulcanization molded component comprising the oscillation plate 68 and the supporting tubular fitting 74.

The bottom end face of the lower flange portion 76b of the supporting tubular fitting 74 is covered by a seal rubber layer 82 integrally formed with the supporting rubber elastic body 80, which extends all the way around the circumferential direction with generally unchanging cross section. The supporting tubular fitting 74 is covered by an interposed rubber 84 which is formed over the outer peripheral face of the tube wall thereof and the axially opposed faces of the upper and lower flange portions 76a, 76b in their entirety. The interposed rubber 84 extends continuously or discontinuously all the way around in the circumferential direction, and is integrally formed with the supporting rubber elastic body 80.

The integrally vulcanization molded component of the supporting rubber elastic body 80 comprising the oscillation plate 68 and the supporting tubular fitting 74 is inserted into the lower opening of the second mounting member 14, with the rib 78 of the supporting tubular fitting 74 press-fit into the caulking portion 62 of the diaphragm outer tubular fitting 24, and with the upper flange portion 76a of the supporting tubular fitting 74 fluid-tightly superposed against the flange portion 36 of the elastic body outer tubular fitting 22 via the seal rubber layer 46. The caulking portion 62 of the diaphragm outer tubular fitting 24 is then subjected to caulking, to fasten the integrally vulcanization molded component of the supporting rubber elastic body 80 comprising the oscillation plate 68 and the supporting tubular fitting 74 to the second mounting member 14 such that the oscillation plate 68 is positioned generally on the center axis of the mounting, as well as to provide the opening at the other end (lower end in FIG. 1) of the second mounting member 14 with fluid-tight closure by means of the integrally vulcanization molded component of the supporting rubber elastic body 80.

With this arrangement, between the opposed faces of the rubber elastic body 16 and the integrally vulcanization molded component of the supporting rubber elastic body 80 comprising the oscillation plate 68 and the supporting tubular fitting 74, there is formed a pressure receiving chamber 86 a portion of whose wall is constituted by the rubber elastic body 16, and which gives rise to pressure fluctuations on the basis of elastic deformation of the rubber elastic body 16 when vibration is input across the first mounting member 12 and the second mounting member 14. A non-compressible fluid is sealed in the pressure receiving chamber 86.

By fluid-tightly affixing the elastic body outer tubular fitting 22 to the diaphragm outer tubular fitting 24 via the seal rubber layer 64, there is formed between the rubber elastic body 16 and the rubber diaphragm 28 an equilibrium chamber 88 a portion of whose wall is constituted by the rubber diaphragm 28, and which readily allows change in volume on the basis of elastic deformation of the rubber diaphragm 28. Additionally, by providing the circumferential groove 40 of the elastic body outer tubular fitting 22 with fluid-tight closure by means of the diaphragm outer tubular fitting 24 via the seal rubber layer 64, there is formed an orifice passage 90 extending a predetermined length (e.g. a length just short of once around the circumference) in the circumferential direction in the diametrically outward of the pressure receiving chamber 86. A first end of the orifice passage 90 connects to the equilibrium chamber 88 through a connecting hole 92 bored in the taper portion 38 of the elastic body outer tubular fitting 22, while the other end of the orifice passage 90 connects to the pressure receiving chamber 86 through a connecting hole 94 bored in the peripheral wall of the elastic body outer tubular fitting 22. With this arrangement, the pressure receiving chamber 86 and the equilibrium chamber 88 communicate with one another through the orifice passage 90 which extends a predetermined length (in this embodiment, a length just short of once around the circumference) in the circumferential direction. As will be apparent thereby, the equilibrium chamber 88 is formed to the opposite side with the rubber elastic body 16 therebetween.

As the non-compressible fluid sealed in the pressure receiving chamber 86 and the equilibrium chamber 88, there may be employed water, alkylene glycol, polyalkylene glycol, silicone oil, or the like. In order to effectively achieve vibration damping action in the vibration frequency ranges required of the automotive engine mount 10, on the basis of fluid action, e.g. resonance action, of fluid caused to flow through the orifice passage 90, a low-viscosity fluid of 0.1 Pa·s or less will be employed, preferably. In this embodiment, passage length and passage sectional area of the orifice passage 90 are established and modified so as to achieve effective vibration damping action against engine shake or other such low-frequency, large-amplitude vibration on the order of ± 1.0 mm or greater and around 10 Hz, on the basis of fluid action, e.g. resonance action, of fluid caused to flow through the orifice passage 90.

To the opposite side of the oscillation plate 68 from the pressure receiving chamber 86 is disposed an electromagnetic oscillator 96 as an actuator. This electromagnetic oscillator 96 has a coil 100 fixedly assembled accommodated within a housing 98 of generally cup shape, with annular upper and lower yoke members 102, 104 of ferromagnetic material assembled around the coil 100 to form a magnetic path. In the center of the upper yoke member 102 is formed a tubular inner peripheral face 106 as a center hole extending in the axial direction, and a guide sleeve 108 is installed elastically positioned on the tubular inner peripheral face 106. A slider 110 of ferromagnetic material serving as the armature is assembled within the guide sleeve 108 so as to be slidable in the axial direction.

The slider 110 is of generally tubular shape overall, disposed slidably on the guide sleeve 108 at the outer peripheral face, in a time gap region formed between the upper and lower yoke members 102, 104; when subjected to magnetic force produced by electrical current passing through the coil 100, it is actuated in the axial direction, while guided by the guide sleeve 108. An annular mating projection 112 projects diametrically inward from the inner peripheral face of the slider 110.

The housing 98, which has a generally bottomed tubular shape, accommodates at the bottom thereof the upper and lower yoke members 102, 104 disposed fixedly therein, with the opening portion thereof extending a predetermined length upward beyond the upper end of the upper yoke member 102. An annular flange portion 114 is integrally formed extending diametrically outward from the opening portion of the housing 98. The inside diameter dimension of the housing 98 is slightly larger than the outside diameter dimension of the lower flange portion 76b of the supporting tubular fitting 74. The outside diameter dimension of the flange portion 114 of the housing 98 is smaller than the inside diameter dimension of the rib 78 of the supporting tubular fitting 74.

An outer bracket 116 is disposed diametrically to the outside of the housing 98. This outer bracket 116 is of large-diameter, generally tubular shape with an inside diameter dimension larger than the outside diameter dimension of the housing 98. At the two axial ends of the outer bracket 116 are integrally formed generally annular shaped flange portions 118, 120 that extend diametrically outward. The outside diameter dimension of the upper flange portion 118 formed at a first axial end (the top end in FIG. 1) of the outer bracket 116 is slightly smaller than the inside diameter dimension of the caulking portion 62 of the diaphragm outer tubular fitting 24.

The housing 98 is inserted into the caulking portion 62 of the diaphragm outer tubular fitting 24, as well as fitting externally onto the lower flange portion 76b of the supporting tubular fitting 74. The flange portion 114 of the housing 98 is superposed fluid-tightly onto the upper flange portion 76a of the supporting tubular fitting 74, via the interposed rubber 84. That is, the interposed rubber 84 is disposed clamped between the upper flange portion 76a of the supporting tubular fitting 74 and the flange portion 114 of the housing 98, thereby providing fluid-tight closure to the opening portion of the housing 98. When disposed in this condition, the lower end face of the flange portion 114 of the housing 98 and the lower end face of the rib 78 of the supporting tubular fitting 74 are generally co-planar, with the outer peripheral face of the lower flange portion 76b and the inner peripheral face of the tube wall of the housing 98 in fluid-tight contact in the circumferential direction over their entirety.

The outer bracket 116 fits externally onto the housing 98, with the upper flange portion 118 of the outer bracket 116 press-fit into the caulking portion 62 of the diaphragm outer tubular fitting 24, superposed on the flange portion 114 of the housing 98 and the rib 78 of the upper flange supporting tubular fitting 74. By then subjecting the caulking portion 62 to a caulking procedure, the housing 98 and the outer bracket 116 are fastened to the second mounting member 14 in such a way that the center axis of the slider 110 is generally coincident with the center axis of the mounting (center axis of the first and second mounting members 12, 14).

The actuating shaft 70 of the oscillation plate 68 is inserted from above on the center axis of the electromagnetic oscillator 96 (center axis of the slider 110) and passed through the mating projection 112 of the slider 110. A coil spring 122 fits externally onto the actuating shaft 70 and is disposed straddling the opposing faces of the oscillation plate 68 and the mating projection 112. A positioning nut 124 is threaded onto a male thread portion at the distal end of the actuating shaft 70. The positioning nut 124 is threaded on the actuating shaft 70 so as to compress the coil spring 122 between itself and the oscillation plate 68 via the mating projection 112, whereby the slider 110 is secured positioned in the axial direction with respect to the actuating shaft 70. The two ends of the coil spring 122 are capped with a collar member 126, reducing friction produced by rubbing between the coil spring 122 and other components. By means of the actuating shaft 70 and the slider 110 being linked in the axial direction by urging force on the coil spring 122, actuating force caused to act on the slider 110 by passing current to the coil 100 is exerted on the oscillation plate 68 via the actuating shaft 70.

The center of the floor of the housing 98 is perforated by an opening 128 which leads into a center hole 130 of the slider 110. By inserting a tool such as a hex wrench through the opening 128 and into the center hole 130 of the slider 110, and turning the positioning nut 124 and a lock bolt 132 screwed in the center of the positioning nut 124, it is possible to adjust from the outside the position of the slider 110 with respect to the actuating shaft 70. That is, by adjusting the extent to which the positioning nut 124 is screwed onto the actuating shaft 70, the mounting location of the slider 110 can be modified with respect to the oscillation plate 68 supported elastically positioned on the second mounting member 14 by the supporting rubber elastic body 80, whereby the distance of the magnetic force acting opposing faces of the slider 110 with respect to the upper and lower yoke members 102, 104 can be adjusted.

A slight gap is formed between the opposing faces of the outer peripheral edge of the positioning nut 124 and the slider 110, and the slider 110 is held superposed against and in contact with the positioning nut 124 in a state permitting sliding displacement in the axis-perpendicular direction with respect to the actuating shaft 70. By means of this arrangement, relative mispositioning of the actuating shaft 70 and the slider 110 due to dimensional error of components during production or to positioning error during assembly can be absorbed advantageously, and the slider 110 can be positioned stably in the axis-perpendicular direction with respect to the coil 100. By advantageously absorbing temporary axis misalignment during operation of the electromagnetic oscillator 96 as well, stabilized operating characteristics can be obtained. A range of 0.2–3.0 mm, for example, would be suitable as the permissible level of relative displacement in the axis-perpendicular direction.

In the opening of a center hole 134 of the lower yoke member 104 is disposed a mounting hole 136 composed of a plurality of grooves that extend continuously in the circumferential direction, with a cover member 138 being disposed in this mounting hole 136. The cover member 138 has a structure wherein the surface of a rigid base plate 140 is covered by a rubber layer 142 formed thereon; it fits into the mounting hole 136 and is supported on a plate spring 144 of "C" shape in plan view detained on the end of the mounting hole 136 utilizing its elastic behavior, whereby it is detachably mounted in the mounting hole 136. By means of this arrangement, the center hole 134 of the lower yoke member 104 is provided with fluid-tight closure by the base plate 140 through the agency of the rubber layer 142. The rubber layer 142 is positioned in opposition across a gap of predetermined distance in the axial direction from the distal end face of the actuating shaft 70 of the oscillation plate 68, whereby when a large load is applied across the first mounting member 12 and the second mounting member 14 causing the actuating shaft 70 to contact the cover member 138, the distal end of the actuating shaft 70 contacts the base plate 140 via the rubber layer 142, on the basis of which displacement of the oscillation plate 68 is limited in a cushioned manner.

The lower end face of the lower flange portion 76b of the supporting tubular fitting 74 is superposed hermetically against the upper yoke member 102 via the seal rubber layer 82 formed covering the lower end face, thereby providing fluid-tight closure to between the outside and the space between the oscillation plate 68 and the electromagnetic oscillator 96, in which the actuating shaft 70, coil spring 122, slider 110 and so on are disposed. With this arrangement, infiltration of water and foreign matter from the outside, and deposition of water and foreign matter on the actuating shaft 70, coil spring 122, slider 110 and other components are prevented. Where needed, in order to moderate the air spring action produced by excited displacement of the oscillation plate 68 in the space between the oscillation plate 68 and the electromagnetic oscillator 96, an air hole may be bored at a suitable location in the peripheral wall of the housing 98 or the like. The air hole may be covered with a filter in order to permit air to pass through while preventing infiltration of water and foreign matter.

A partition member 146 is disposed in the medial portion of the pressure receiving chamber 86 between the rubber elastic body 16 and the oscillation plate 68. The partition member 146 has a disk shape overall, and is fabricated of metal, synthetic resin, or other rigid material. The partition member 146 is constituted to include an upper divider plate in the form of an upper cover member 148 and a lower divider plate in the form of a lower cover member 150 stacked together in the direction of opposition of the rubber elastic body 16 and the oscillation plate 68 (the vertical in FIG. 1).

The upper cover member 148 serving as the upper divider plate is of large-diameter, generally bottomed tubular shape open at the bottom, with a flange portion 152 flaring diametrically outward in generally annular shape being integrally formed in the opening portion thereof. An upper through hole 154 of large-diameter, generally circular shape is bored through the center portion of the upper cover member 148.

On the other hand, the lower cover member 150 serving as the lower divider plate is of large-diameter, generally bottomed tubular shape open at the bottom, with a flange portion 156 flaring diametrically outward in generally annular shape being integrally formed in the opening portion thereof. Here, the lower cover member 150 is made shallower than the upper cover member 148 and the outside diameter dimension of the lower cover member 150 is smaller than the inside diameter dimension of the upper cover member 148. The flange portion 152 of the upper cover member 148 and the flange portion 156 of the lower cover member 150 have approximately identical outside diameter dimensions. In the center portion of the lower cover member 150 are formed a plurality of through holes 158 disposed at a plurality of locations spaced predetermined distance apart in the axis-perpendicular direction and circumferential direction. The through holes 158 are of small-diameter, generally circular shape, with the opening area of each through hole 158 being smaller than the opening area of the upper cover member 148. The shape, size, and placement of the upper through hole 154 and lower through holes 158 are established and modified appropriately on the basis of tuning of the resonance frequency of fluid caused to flow through the upper and lower through holes 154, 158. In this embodiment, the upper and lower through holes 154, 158 cooperate to form a communication hole.

With the upper cover member 148 positioned closer to the pressure receiving chamber 86 side than the lower cover member 150, the lower cover member 150 is mated with the upper cover member 148 in the axial direction of the mounting (the vertical in FIG. 1). The flange portion 152 of the upper cover member 148 and the flange portion 156 of the lower cover member 150 are superposed against one another in the axial direction of the mounting, and via the seal rubber layer 46 are held sandwiched between the elastic body outer tubular fitting 22 and the upper flange portion 76a of the supporting tubular fitting 74, on the basis of which the outer peripheral edge of the upper cover member 148 and the outer peripheral edge of the lower cover member 150 are fixedly supported by the second mounting member 14. With this arrangement, the partition member 146 composed of the upper and lower cover members 148, 150 is affixed so as to extend out in the generally axis-perpendicular direction with respect to the second mounting member 14.

By disposing the partition member 146 in the medial portion of the pressure receiving chamber 86 to fluid-tightly bifurcate the pressure receiving chamber 86 in this way, there is formed on the rubber elastic body 16 side of the partition member 146 a primary fluid chamber 160 whose wall is constituted inter alia by the rubber elastic body 16, the elastic body outer tubular fitting 22, and the upper cover member 148, and which is interconnected with the equilibrium chamber 88 through the orifice passage 90. On the oscillation plate 68 side of the partition member 146 there is formed an auxiliary fluid chamber 162 whose wall is constituted inter alia by the oscillation plate 68, the supporting rubber elastic body 80, and the lower cover member 150.

By superposing the upper and lower cover members 148, 150 in this way, between the opposing faces of the center portion of the upper cover member 148 and the center portion of the lower cover member 150, there is disposed an accommodation zone 164 of generally circular plate shape communicating with the primary fluid chamber 160 and the auxiliary fluid chamber 162 via the upper and lower through holes 154, 158. A movable plate 166 is disposed in this accommodation zone 164.

Figure 3:
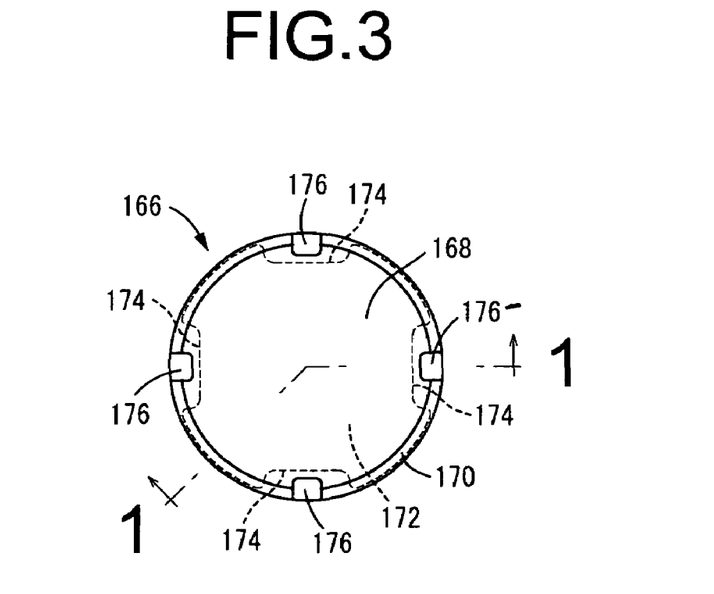
FIG. 3 is a top plane view of a movable plate of the engine mount of FIG. 1.

As shown in FIG. 3 as well, the movable plate 166 is of generally circular plate shape, and comprises a rubber elastic plate 168 which consists of an elastically deformable, thin rubber film. At the outer peripheral edge of the rubber elastic plate 168 is integrally formed a generally annular contact projection 170 which projects out a predetermined length to either side in the axial direction.

The movable plate 166 comprises a constriction plate 172 that functions as a constriction plate member, affixed embedded within the medial portion of the rubber elastic plate 168 in the thickness direction thereof. This constriction plate 172 has a generally circular plate shape, and is produced using metal, synthetic resin, or other rigid material to endow it with greater elastic rigidity than the rubber elastic plate 168, despite being thin. The outside diameter dimension of the constriction plate 172 is generally the same as or slightly smaller than the outside diameter dimension of the rubber elastic plate 168, whereby the outer peripheral edge of the constriction plate 172 is positioned in the medial portion in the thickness direction of a pair of contact projections 170, 170 integrally formed in the outer peripheral portion of the rubber elastic plate 168. That is, the movable plate 166 is of laminated construction, in which the rubber elastic plate 168 and the constriction plate 172 are integrally affixed in a layer arrangement.

At the outer peripheral edge of the constriction plate 172 are formed notch portions 174 that open diametrically outward in recess configuration. In this embodiment in particular, there are four notch portions 174 spaced apart by predetermined distances in the circumferential direction. The rubber material of the rubber elastic plate 168 fills the notch portions 174.

In the rubber elastic plate 168 situated in the laterally medial portions of the notch portions 174, there are integrally formed pairs of interposed portions 176, 176 as elastic projections that project axially outward beyond the contact projections 170 projecting axially to either side. That is, four interposed portions 176 are disposed spaced apart from one another by predetermined distance, on the circumference of the outer peripheral portion of each side of the rubber elastic plate 168. While the shape and size of the interposed portions 176 are not especially limited, in this embodiment, they are of rectangular shape in plan view, with each pair of interposed portions 176 situated in opposition in the axial direction being situated in the laterally medial portions of the notch portions 174, and so as to not overlap the constriction plate 172 in the axial direction. As will be apparent from the preceding description, the thickness dimension of the movable plate 166 increases in order from the center portion of the rubber elastic plate 168 where the constriction plate 172 is embedded, to the peripheral portions of the rubber elastic plate 168 where the pair of contact projections 170, 170 are integrally formed, and the peripheral portions of the rubber elastic plate 168 where the pairs of interposed portions 176, 176 situated in the notch portions 174 are integrally formed.

The movable plate 166, with its center axis positioned generally on the center axis of the mounting 10, is disposed accommodated within the accommodation zone 164, with the interposed portions 176 of the movable plate 166 held sandwiched in the thickness direction (the vertical in FIG. 1) between the upper cover member 148 and the lower cover member 150. Accordingly, the movable plate 166 is fixedly supported on the partition member 146 so as to extend in the generally axis-perpendicular direction in the accommodation zone 164.

One side of the movable plate 166 faces the primary fluid chamber 160 through the upper through hole 154 in the upper cover member 148, while the other side of the movable plate 166 faces the auxiliary fluid chamber 162 through the lower through hole 158 in the lower cover member 150. As a result, when a pressure difference between the primary fluid chamber 160 and the auxiliary fluid chamber 162 is exerted to either side of the movable plate 166, on the basis of elastic deformation of the interposed portions 176, the center portion of the rubber elastic plate 168 undergoes displacement in the axial direction between the upper and lower cover members 148, 150 (i.e. the accommodation zone 164), integrally with the constriction plate 172. It will be apparent from the preceding description that the through hole formed in the partition member 146 to connect the primary fluid chamber 160 and the auxiliary fluid chamber 162 to one another is composed to include the upper through hole 154 of the upper cover member 148 and the lower through hole 158 of the lower cover member 150.

In this embodiment, the resonance frequency of fluid caused to flow through the upper and lower through holes 154, 158 in association with displacement of the movable plate 166 is established at a frequency equal to or greater than that of the vibration targeted for damping by means of pressure control of the pressure receiving chamber 86 by means of exciting actuation of the oscillation plate 68. As a specific example, the resonance frequency of fluid through the upper and lower through holes 154, 158 is established in a frequency range equal to or higher than that of medium-frequency vibration such as idling vibration, on the order of ±0.1–0.25 mm and 20–40 Hz. Additionally, the resonance frequency of the fluid could be established in a frequency range lower than higher harmonics produced by elastic deformation of the supporting rubber elastic body 80 or lower than high-frequency components produced in the actuating force due to noise of various kinds on the electrical signal which controls the actuating force generated by the electromagnetic oscillator 96. Tuning of resonance frequency may be accomplished, for example, by appropriately establishing or modifying the spring constant and mass of the movable plate 166, or the flow passage length and flow passage sectional area of the upper and lower through holes 154, 158.

Figure 4:
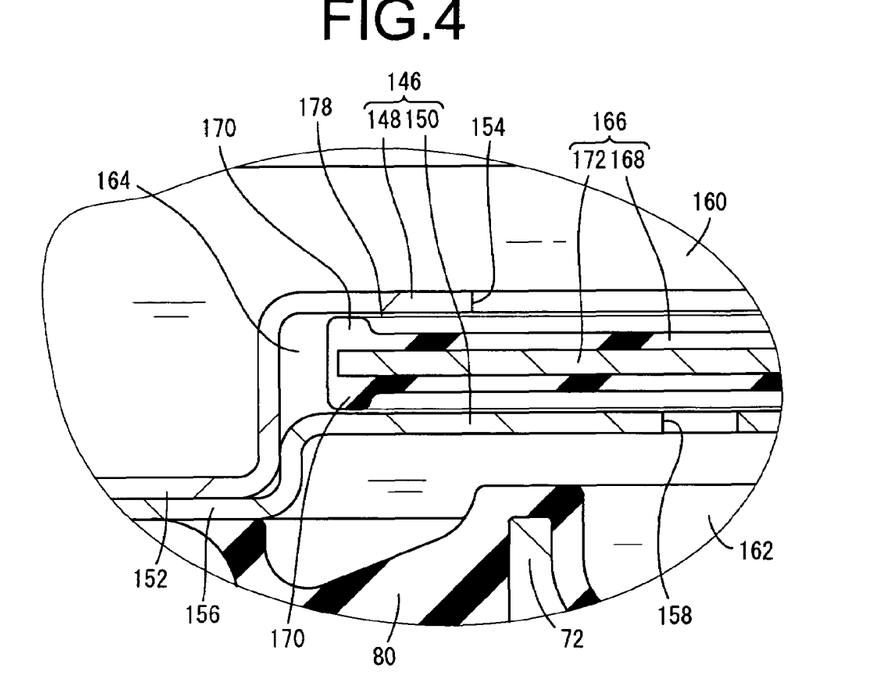
FIG. 4 is a fragmentary enlarged cross sectional view showing a principle part of the engine mount of FIG. 1.
Figure 5:
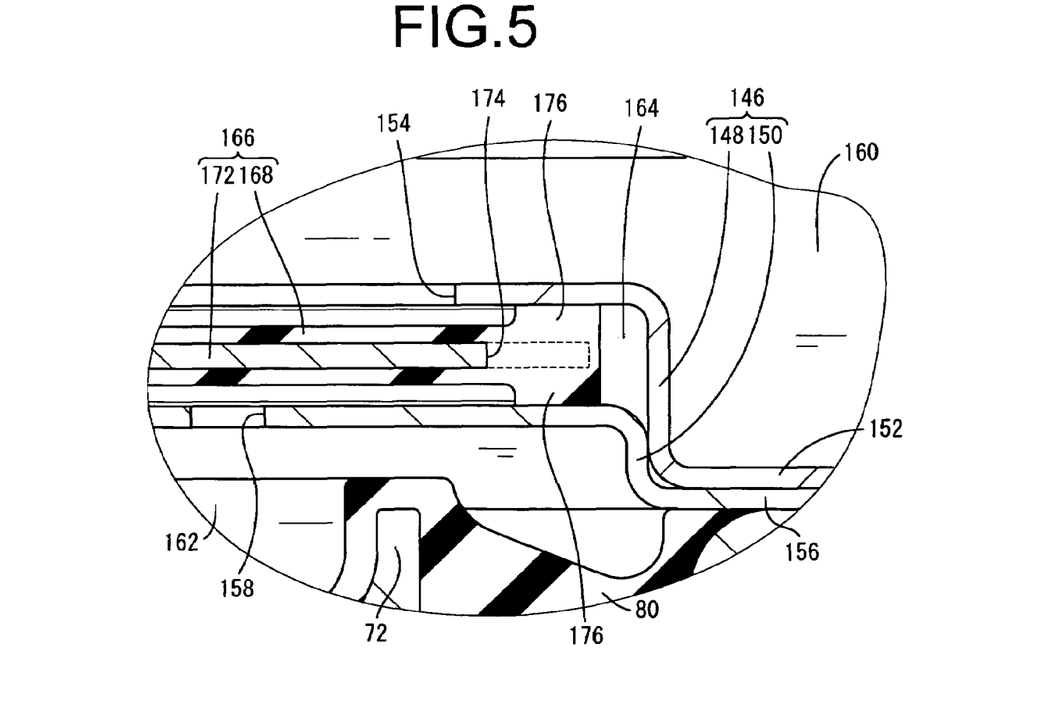
FIG. 5 is a fragmentary enlarged cross sectional view showing another principle part of the engine mount of FIG. 1.

With the movable plate 166 disposed in this manner, as depicted in enlarged view in FIGS. 4–5, the contact projections 170 of the movable plate 166 and the upper cover member 148 or lower cover member 150 are situated in opposition across a slight gap in the axial direction. Specifically, in the outer peripheral portion of the movable plate 166, a connecting gap 178 is formed between the upper cover member 148 and lower cover member 150, and the contact projections 170, 170 excluding the plurality of interposed portions 176, with the primary fluid chamber 160 and the auxiliary fluid chamber 162 communicating with one another through this connecting gap 178 and the upper and lower through holes 154, 158.

On the basis of a pressure difference between the primary fluid chamber 160 and the auxiliary fluid chamber 162 exerted to either side of the movable plate 166 and on elastic deformation of the interposed portions 176, the movable plate 166 undergoes appreciable displacement whereupon either of the pair of contact projections 170 projecting to either side comes into contact with the upper cover member 148 or the lower cover member 150, whereby the upper through hole 154, lower through hole 158, and connecting gap 178 are substantially blocked off by the movable plate 166.

In this embodiment, by appropriately establishing or modifying the resonance frequency of fluid caused to flow through the upper and lower through holes 154, 158 in association with displacement of the movable plate 166, when low-frequency, large-amplitude vibration of ±0.1 mm or more corresponding to engine shake for example is input to the pressure receiving chamber 86, the contact projections 170 of the movable plate 166 can be made to come into contact with the upper cover member 148 or the lower cover member 150, substantially blocking off the upper and lower through holes 154, 158 and the connecting gap 178. On the other hand, when small-amplitude vibration in a frequency range of ±0.10–0.25 mm corresponding to idling vibration for example is input, the contact projections 170 of the movable plate 166 do not come into contact with the upper cover member 148 or the lower cover member 150, on the basis of which the upper and lower through holes 154, 158 and the connecting gap 178 are maintained in the open state.

In the engine mount 10 having construction as described here, by fastening the first mounting member 12 to the power unit by means of a fastening bolt (not shown) or the like passed through the mounting hole 52 of the mounting plate 50 on the one hand, and fastening the second mounting member 14 to the car body side by means of a fastening bolt (not shown) or the like attached to the lower flange portion 120 of the outer bracket 116, the mounting is installed between the power unit and the car body to provide vibration-damped support of the power unit on the body. In the installed state, when vibration is input across the first mounting member 12 and the second mounting member 14, fluid flow is produced through the orifice passage 90 on the basis of the pressure difference created between the pressure receiving chamber 86 and the equilibrium chamber 88 by means of elastic deformation of the rubber elastic body 16, whereby passive vibration-damping action is exhibited on the basis of flow action, e.g. resonance action, of the fluid.

In this embodiment, the movable plate 166 is disposed between the upper and lower cover members 148, 150 that divide the pressure receiving chamber 86 into the primary fluid chamber 160 and the auxiliary fluid chamber 162. When low-frequency, large-amplitude vibration of ±0.1 mm or more corresponding to engine shake for example, is input to the primary fluid chamber 160, the contact projections 170 of the movable plate 166 come into contact with the upper cover member 148 or the lower cover member 150, substantially blocking off the upper and lower through holes 154, 158 and the connecting gap 178. As a result, during input of such large-amplitude vibration, the pressure of the primary fluid chamber 160 is prevented from escaping to the auxiliary fluid chamber 162 through the upper and lower through holes 154, 158 and the connecting gap 178, thereby preventing absorption of the pressure of the primary fluid chamber 160 caused by displacement and deformation of the supporting rubber elastic body 80 and the oscillation plate 68 making up part of the wall of the auxiliary fluid chamber 162. Thus, passive vibration-damping action is exhibited advantageously by means of the orifice effect on the basis of the large pressure difference between the primary fluid chamber 160 and the equilibrium chamber 88.

In the event that impact-wise large-amplitude vibration corresponding to engine shake occurring when driving over a speed bump in particular, transmission of pressure fluctuations from the primary fluid chamber 160 to the auxiliary fluid chamber 162 is restricted and excessive deformation of the supporting rubber elastic body 80 is avoided, whereby damage and diminished endurance of the supporting rubber elastic body 80 are effectively prevented.

Also, by carrying out adaptive control or other feedback control using the power unit engine ignition signal as a reference signal and using the vibration detection signal of a component to be damped (e.g. the car body) as an error signal, for example, flow of current to the coil 100 is controlled, and the actuating shaft 70 is subjected to exciting actuation in the axial direction. As a result, when low-frequency vibration such as engine shake is input for example, by means of drive control of the oscillation plate 68 such that pressure fluctuations are effectively produced between the pressure receiving chamber 86 composed of the primary fluid chamber 160 and the auxiliary fluid chamber 162 on the one hand and the equilibrium chamber 88 on the other, adequate flow of fluid through the orifice passage 90 is assured, and vibration damping action on the basis of flow action, e.g. resonance action, of fluid through the orifice passage 90 is more advantageously achieved.

Further, when medium-frequency vibration, e.g. idling vibration, has been input, by means of subjecting the oscillation plate 68 to actuating force corresponding to this vibration, on the basis of exciting actuation of the oscillation plate 68, fluid flow is permitted through the through holes in the partition member 146, namely, the upper and lower through holes 154, 158 and the connecting gap 178 in association with displacement of the movable plate 166 in the axial direction. Accordingly, pressure fluctuations are transmitted from the auxiliary fluid chamber 162 to the primary fluid chamber 160 and the internal pressure of the pressure receiving chamber 86 is controlled, so that active and dynamic vibration damping action is exhibited against the medium-frequency vibration. For medium-frequency input vibration whose frequency range is above the tuning frequency of the orifice passage 90, since the orifice passage 90 becomes substantially blocked off due to antiresonance action of fluid through the orifice passage 90, fluid flow through the upper and lower through holes 154, 158 and the connecting gap 178 is effectively assured.

In this embodiment, when small-amplitude vibration in a medium-frequency range of ±0.1–0.25 mm corresponding to idling vibration is applied, contact of the contact projections 170 of the movable plate 166 against the upper and lower cover plates 148, 150 is prevented so that the upper and lower through holes 154, 158 and the connecting gap 178 are maintained in the open state. Under this condition, transmission of pressure from the auxiliary fluid chamber 162 to the primary fluid chamber 160 is permitted in association with displacement of the movable plate 166 based on a pressure difference between the primary fluid chamber 160 and the auxiliary fluid chamber 162 based on excitation control of the oscillation plate 68. Additionally, in conjunction with tuning the resonance frequency of fluid caused to flow through the upper and lower through holes 154, 158 and the connecting gap 178 in association with displacement of the movable plate 166 to a frequency range the same as or higher than idling vibration or other medium-frequency vibration targeted for dynamic damping by means of the oscillation plate 68, pressure fluctuations produced in the auxiliary fluid chamber 162 on the basis of exciting actuation of the oscillation plate 68 are transmitted efficiently to the primary fluid chamber 160, utilizing the resonance action of the fluid. Thus, the desired active and dynamic vibration damping action can be more advantageously exhibited.

In this embodiment, in particular, the resonance frequency of fluid caused to flow through the upper and lower through holes 154, 158 and the connecting gap 178 in association with displacement of the movable plate 166 is established in a frequency range lower than high order components of elastic deformation of the supporting rubber elastic body 80 per se or high frequency components produced in the actuating force due to noise of various kinds on the electrical signal which controls the actuating force generated by the electromagnetic oscillator 96. With this arrangement, when high order pressure fluctuations have been produced in the auxiliary fluid chamber 162, a filter action is exhibited on pressure transmission from the auxiliary fluid chamber 162 to the primary fluid chamber 160 through the upper and lower through holes 154, 158 and the connecting gap 178, so that pressure transmission of high order components is suppressed. As a result, it becomes possible to produce in the primary fluid chamber 160 pressure fluctuations of frequency and waveform which correspond highly to the vibration targeted for damping, so that the desired dynamic vibration damping action can be more effectively obtained.

A significant characterizing feature of this embodiment is that the movable plate 166 is elastically supported on the upper and lower cover members 148, 150 by each pair of interposed portions 176, 176 that project to either axial side from four locations on the circumference, and that the constriction plate 172 is embedded in the rubber elastic plate 168 to produce a laminated construction, whereby displacement of the movable plate 166 is made extremely stable.

Thus, during input of large-amplitude vibration, the movable plate 166 is brought into stable contact against the upper and lower cover members 148, 150, pressure leakage from the primary fluid chamber 160 to the auxiliary fluid chamber 162 can be more effectively prevented, and further improvement in passive vibration damping effect based on the orifice effect can be obtained. Additionally, during input of medium-frequency vibration, the movable plate 166 is made to undergo efficient displacement in the axial direction, and pressure transmission from the auxiliary fluid chamber 162 to the primary fluid chamber 160 on the basis of exciting actuation of the oscillation plate 68 is accomplished efficiently. Thus, the desired dynamic vibration damping action is more consistently obtained.

In this embodiment as well, by employing the electromagnetic oscillator 96 like that shown by example herein, that actuates the oscillation plate 68 in one direction (e.g. downward in FIG. 1) and utilizes the elastic behavior of the supporting rubber elastic body 80 to return the oscillation plate 68 to its original position, during exiting actuation of the oscillation plate 68, the equilibrium position becomes displaced bias-wise by a predetermined extent in the actuation direction (e.g. downward in FIG. 1). As a result, there is a risk of adverse effects on actuating characteristics of the oscillation plate 68 by the pressure differential exerted between the primary fluid chamber 160 and the auxiliary fluid chamber 162, due to a change in the initial position of the oscillation plate 68 during actuation, for example.

Accordingly, by means of the connecting gap 178 formed between the contact projections 170 of the movable plate 166 and the upper cover member 148 and lower cover member 150, the pressure difference is rapidly dissipated between the primary fluid chamber 160 and the auxiliary fluid chamber 162 in association with the change in the initial position of the oscillation plate 68 through the connecting gap 178, so that the desired vibration damping action is achieved more consistently.

While the present invention has been described in detail in its presently preferred embodiment, for illustrative purpose only, it is to be understood that the invention is by no means limited to the details of the illustrated embodiment, but may be otherwise embodied. It is also to be understood that the present invention may be embodied with various changes, modifications and improvements which may occur to those skilled in the art, without departing from the spirit and scope of the invention.

For example, in the embodiment hereinabove, the upper cover member 148 and the lower cover member 150 are superposed in the axial direction, and the flange portions 152, 156 of the upper and lower cover members 148, 150 are held sandwiched between the elastic body outer tubular fitting 22 and the supporting tubular fitting 74, thereby constituting the partition member 146. However, it would be acceptable instead to sandwich only the outer peripheral edge portion of the lower cover member 150 (the flange portion 156) between the elastic body outer tubular fitting 22 and the supporting tubular fitting 74, and to superimpose the upper cover member 148 onto the lower cover member 150 in the axial direction and affix it thereto by means of bolting, welding or the like, to constitute the partition member 146.

The shape, size, and construction of the movable plate 166 are not limited to those disclosed by way of example herein. Specifically, by way of example, outer dimensions greater than the opening area of the upper through hole 154 and the lower through hole 158 could be provided in the center portion of the movable plate 166 to form projections of plateau shape projecting to either side in the axial direction, with the projections coming into contact with the upper cover member 148 and the lower cover member 150 in order to close off the upper through hole 154 and the lower through hole 158. With this arrangement, when large-amplitude vibration is input to the primary fluid chamber 160, the movable plate 166 rapidly moves into contact with the upper and lower cover members 148, 150 and closes off the upper and lower through holes 154, 158, whereby pressure leakage from the primary fluid chamber 160 to the auxiliary fluid chamber 162 may be prevented more favorably.

By integrally forming the aforementioned projections of plateau shape with the rubber elastic plate 168 for example, sudden displacement of the movable plate 166 is cushioned on the basis of elastic deformation of the projections, which as a result provides the advantage that the occurrence of large noises and shock is suppressed even more effectively.

The shape, size, construction, location, and other design aspects of the primary fluid chamber 160, the auxiliary fluid chamber 162, the equilibrium chamber 88, the orifice passage 90 and so on are not limited to those taught herein by way of example, and may be established and modified suitably according to the desired vibration damping action, manufacturing conditions, and so on.

For example, in the illustrated embodiment, the resonance frequency of the fluid caused to flow through the upper and lower through holes 154, 158 and the connecting gap 178 in association with displacement of the movable plate 166 was set to a frequency range the same as or higher than that of small-amplitude vibration in the medium-frequency range corresponding to idling vibration or the like on the order of ±0.1–0.25 mm and 20–40 Hz. However, it would be acceptable instead to set it to a frequency range the same as or higher than that of small-amplitude vibration in the high-frequency range corresponding to drive rumble or the like on the order of +0.01–0.02 mm and 60–120 Hz.

Additionally, the electromagnetic oscillator 96 employed is not limited to that described herein by way of example. It is possible for example to instead employ a construction wherein, for example, a permanent magnet is disposed on the stationary element side, and the moving element side is constituted by a movable member consisting of ferromagnetic material, whereby the N pole and S pole of the stationary element side increase and decrease in alternating fashion by means of the magnetic field created when current is passed through the coil, causing the movable member to undergo reciprocation (the basic principle of this design are known, having been disclosed, for example, in JP-A-2003-339145, and the detailed description of it will not be provided); or to employ an electromagnetic actuator of any of various other known type, such as those disclosed in JP-A-2000-213586 or JP-A-2001-1765.

Whereas in the illustrated embodiment, the rubber diaphragm 28 consisting of thin rubber film was employed as the flexible diaphragm, a diaphragm composed of thin synthetic resin material having pliability could be employed instead.

Apart from the engine mount described herein by way of example, the invention is applicable generally to dynamic vibration damping apparatus; for example, it could be reduced to practice as a fluid-filled dynamic vibration damping apparatus in a tubular engine mount employed as an FF type automotive engine mount (see JP-A-2002-155984 for example), or utilized similarly as a vibration damping connector or vibration damping support interposed between two members such as the power unit and body as described herein by way of example, or as a damper for mounting onto a vibrating target to be damped. Specifically, the fluid-filled dynamic vibration damping apparatus may be realized, for example, by fastening the second mounting member of the engine mount described in the preceding embodiment by means of a bracket to the vibrating target to be damped, and attaching a mass member of suitable mass to a mounting plate portion provided to the first mounting member, to realize a dynamic vibration damping apparatus.

The invention is also applicable to an engine mount furnished with an equilibrium chamber on the opposite side from the pressure receiving chamber, with an oscillation plate or a supporting rubber elastic body therebetween, as taught in JP-A-2002-188677, for example.

Additionally, the invention may be reduced to practice similarly in an automotive body mounting or member mounting; in mountings, dampers, and other vibration damping apparatus in various non-automotive apparatus; and in actuators used in such vibration damping apparatus.

What is claimed is:

1. A fluid-filled active damping apparatus comprising:
   a first mounting member;
   a second mounting member;
   a rubber elastic body elastically connecting the first and second mounting members;
   a pressure receiving chamber filled with a non-compressible fluid, whose wall is partially defined by the rubber elastic body, and subjected to input of vibration;
   an equilibrium chamber filled with the non-compressible fluid, whose wall is partially defined by a flexible diaphragm to readily permit change in volume;
   an oscillation plate defining an another portion of the wall of the pressure receiving chamber, and elastically supported so to be capable of displacement, the oscillation plate being excited by an actuator for pressure control of the pressure receiving chamber;

a partition member fixedly supported on the second mounting member to divide the pressure receiving chamber, forming to either side of the partition member a primary fluid chamber situated on the rubber elastic body side and an auxiliary fluid chamber situated on the oscillation plate side, the primary fluid chamber and the auxiliary fluid chamber being held in communication with each other through a communication hole formed in the partition member; and an orifice passage being provided connecting the primary fluid chamber and the equilibrium chamber to each other, wherein the partition member includes: an upper divider plate and a lower divider plate superposed on each other, with the communication hole being formed in combination with at least one upper through hole provided in the upper divider plate and at least one lower through hole provided in the lower divider plate; and a movable plate of size extending entirely across between opposing faces of the upper and lower through holes, being disposed between the upper divider plate and the lower divider plate, wherein a plurality of elastic projections that project to both sides of the movable plate from an outer peripheral portion of a first and a second face of the movable plate, so as to be spaced apart from one another on a circumferential direction of the movable plate, these elastic projections being held sandwiched between the upper divider plate and the lower divider plate so that the first face of the movable plate is exposed to the primary fluid chamber through the upper through hole and the second face of the movable plate is exposed to the auxiliary fluid chamber through the lower through hole, whereby when a pressure difference between the primary fluid chamber and the auxiliary fluid chamber is exerted across the movable plate, the movable plate undergoes displacement between the upper divider plate and the lower divider plate, wherein the upper through hole or the lower through hole is blocked off by the movable plate by means of the movable plate coming into contact with the upper divider plate or the lower divider plate, and a resonance frequency of fluid induced to flow through the upper and lower through holes in association with displacement of the movable plate is established at a frequency equal to or above that of vibration targeted for damping by pressure control of the pressure receiving chamber by means of excitation actuation of the oscillation plate, and wherein a connecting gap is formed between the upper and lower divider plates and the peripheral portion of the movable plate where the elastic projections have not been formed, to connect the primary fluid chamber and the auxiliary fluid chamber to each other through the upper and lower through holes and the connecting gap.

2. A fluid-filled active damping apparatus according to claim 1, wherein the movable plate is of a generally laminated construction having a constriction plate member more rigid than a rubber elastic plate affixed to the constriction plate member, and notched portions are provided at a plurality of locations on a perimeter of an outer peripheral portion of the constriction plate member, the elastic projections being integrally formed so as to project out from respective portions of the rubber elastic plate situated at the notched portions.

3. A fluid-filled active damping apparatus according to claim 1, wherein the at least one upper through hole is formed by one opening in the center portion of the upper divider plate, while the at least one lower through hole comprises a plurality of lower through holes formed in the lower divider plate, each having a smaller opening area than the upper through hole.

4. A fluid-filled active damping apparatus according to claim 1, wherein the actuator comprises an electromagnetic actuator that generates actuating force by means of electrical current to a coil.

5. A fluid-filled active damping apparatus according to claim 1, wherein the first mounting member is disposed spaced apart from one open end of the second mounting member of generally tubular shape; the one open end of the second mounting member is provided fluid-tight closure by the rubber elastic body that elastically connects the first mounting member and the second mounting member; the oscillation plate is disposed at an other open end of the second mounting member, with an outer peripheral edge of the oscillation plate elastically connected by an annular supporting rubber elastic body to the other open end of the second mounting member, whereby the other open end of the second mounting member is provided fluid-tight closure; the pressure receiving chamber is formed between opposing faces of the rubber elastic body and the oscillation plate; the actuator is disposed on an opposite side from the pressure receiving chamber with the oscillation plate therebetween; and the partition member is disposed in an medial portion of the opposing faces of the rubber elastic body and the oscillation plate so as to extend in an axis-perpendicular direction of the second mounting member, with an outer peripheral edge of the partition member fixedly supported by means of the second mounting member.

6. A fluid-filled active damping apparatus according to claim 5, wherein the flexible diaphragm is formed by a rubber diaphragm extending in generally annular shape so as to cover an outer peripheral side of the rubber elastic body, with an outer peripheral edge portion of the rubber diaphragm affixed to the one open end of the second mounting member and an inner peripheral edge portion of the rubber diaphragm affixed to the first mounting member, thereby forming the equilibrium chamber to an opposite side from the pressure receiving chamber with the rubber elastic body therebetween.

7. A fluid-filled active damping apparatus according to claim 1, wherein the first mounting member is fastened to either a power unit or a body of an automobile, with the second mounting member being fastened to an other in order to constitute an automotive engine mount; the orifice passage is tuned to low frequency corresponding to engine shake; when low-frequency, large-amplitude vibration of ±1.0 mm or greater corresponding to engine shake is input, the movable plate strikes against the upper divider plate and the lower divider plate thereby substantially blocking off the communication hole; and when medium-to-high-frequency, small-amplitude vibration of ±0.1 mm or less corresponding to idling vibration or booming noises is input, striking of the movable plate against the upper divider plate and the lower divider plate is avoided so that the communication hole are maintained in the open state.

8. A fluid-filled active damping apparatus according to claim 5, wherein the first mounting member is fastened to either a power unit or a body of an automobile, with the second mounting member being fastened to an other in order to constitute an automotive engine mount; the orifice passage is tuned to low frequency corresponding to engine shake; when low-frequency, large-amplitude vibration of ±1.0 mm or greater corresponding to engine shake is input, the movable plate strikes against the upper divider plate and the lower divider plate thereby substantially blocking off the communication hole; and when medium-to-high-frequency, small-amplitude vibration of ±0.1 mm or less corresponding to idling vibration or booming noises is input, striking of the movable plate against the upper divider plate and the lower divider plate is avoided so that the communication hole are maintained in the open state, and wherein a resonance frequency of fluid caused to flow through the upper and lower through holes and the connecting gap in association with displacement of the movable plate is established in a frequency range lower than high order components of elastic deformation of the supporting rubber elastic body per se or high frequency components produced in an actuating force due to noise of various kinds on an electrical signal which controls actuating force generated by the actuator.

* * * * *